April 2, 1929.  F. A. DUGAN  1,707,799

POURING VESSEL

Filed Sept. 23, 1927

Inventor,
Francis A. Dugan,
By Samuel W. Balch
Attorney.

Patented Apr. 2, 1929.

1,707,799

UNITED STATES PATENT OFFICE.

FRANCIS A. DUGAN, OF NUTLEY, NEW JERSEY.

POURING VESSEL.

Application filed September 23, 1927. Serial No. 221,494.

In chemical operations and also in culinary operations, it is sometimes required to separate from mixtures the fractions of higher specific gravity which are liquid or which become liquid when the material is warmed and which separate and settle by gravity, such materials being greases which contain heavy oils, and liquors which yield a scum.

The object is to provide a pouring vessel for such separations which consists of a bowl and a spout in communication with the bowl adjacent to its bottom through which to discharge the heavy liquid fractions and solids suspended therein after they have had an opportunity to settle and also to prevent the discharge through the spout of any of the lighter fractions.

In the accompanying sheet of drawings which forms a part of this description,

Figure 1:
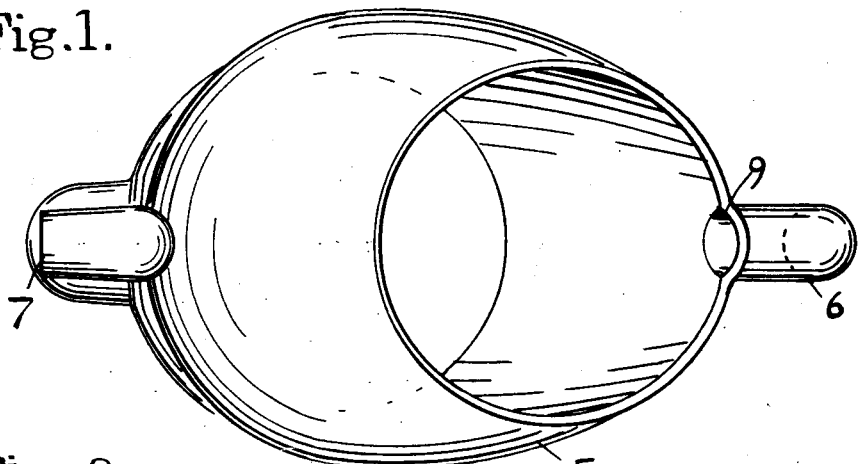
Figure 1 is a plan view of a pouring vessel which embodies this invention.
Figure 2:
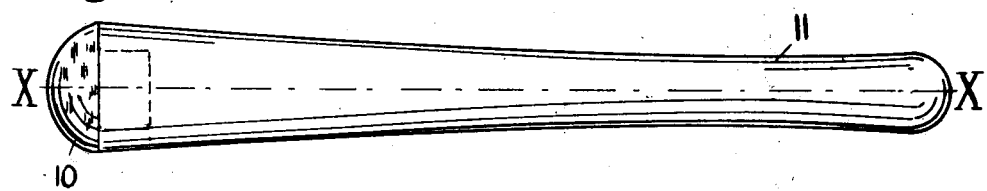
Fig. 2 shows the valve and valve stem to be used therewith.
Figure 3:
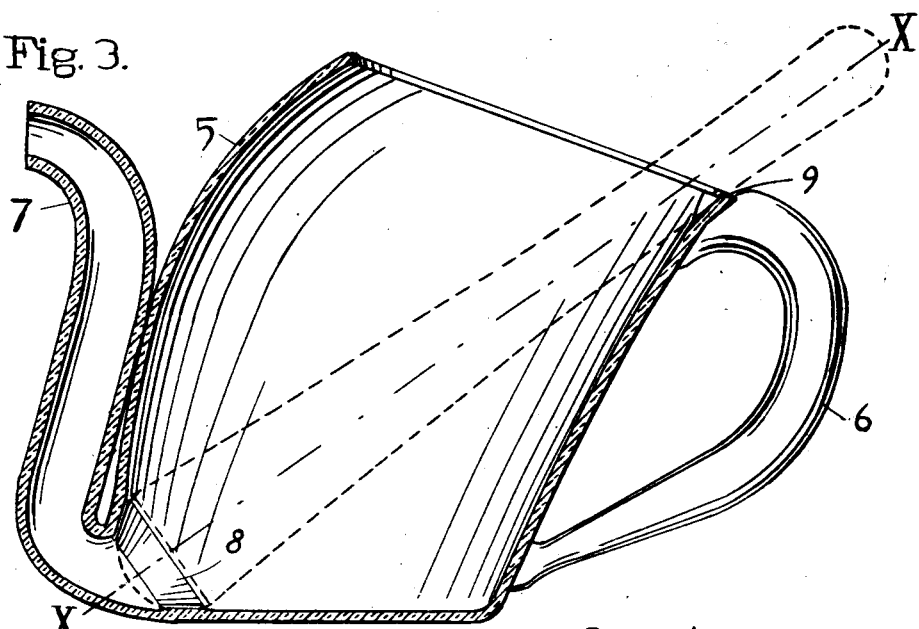
Fig. 3 is a vertical section through the pouring vessel.

The vessel comprises a bowl 5 with a handle 6 and a spout 7. The spout joins the bowl adjacent to the bottom of the bowl and at the point of communication the entrance from the bowl into the spout is suitably beveled to form a valve seat 8 which is a surface of revolution, as shown a conical surface, with its axis X—X diagonally directed toward the rim on the opposite side of the bowl at 9. Cooperating with the valve seat is a valve 10 of yielding material, as cork or rubber, and a stem or handle 11 of wood porcelain or other material in the form of a pestle. The materials of the pouring vessel and of the pestle are such as will not be attacked by the ingredients of the substance to be separated and which will stand heat without softening or cracking if heat is required to promote the separation. The rim of the bowl is conveniently indented to assist in locating the handle for the proper seating of the valve and the relation of the parts is such that the valve when set in place on the valve seat will be held there by gravity and it is not necessary for walls of the valve seat to have a taper such that the valve will bind therein.

In operation, before first filling the vessel, the valve is set in place and while held in place the material to be separated is put in. This is so that none of the unseparated material will rise in the spout. When a quantity of the heavier fractions sufficient to fill the spout and cover the entrance thereto has separated and settled to the bottom of the bowl, the valve may be removed. If more material is to be separated than the capacity of the vessel, only a portion of the separated heavy liquor will be poured off at a time, leaving enough behind to cover the entrance to the spout, and room thereby made for more of the material to be separated. It will then not be necessary to return the valve.

I claim:

A pouring vessel having an open-top bowl, an upturned spout communicating with the bowl adjacent to its bottom, and a valve seat which is a surface of revolution at the point of communication between the bowl and the spout with its axis diagonally directed toward the rim on the opposite side of the bowl, in combination with a valve rotatably and removably mounted against the valve seat with its stem lying along the axis of the valve seat and resting on the rim.

FRANCIS A. DUGAN.